(12) United States Patent
McGrath et al.

(10) Patent No.: US 6,399,694 B1
(45) Date of Patent: Jun. 4, 2002

(54) COLORABLE FIBERGLASS INSULATION

(75) Inventors: Ralph D. McGrath; Frank O'Brien Bernini; Jocelyn M. Seng; Neil R. Hettler, all of Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/607,269

(22) Filed: Jun. 30, 2000

(51) Int. Cl.$^7$ .................... C08K 3/40; B32B 17/10
(52) U.S. Cl. ........................ 524/494; 428/430
(58) Field of Search ............................ 524/494; 428/430

(56) References Cited

U.S. PATENT DOCUMENTS

| | | |
|---|---|---|
| 4,648,920 A | 3/1987 | Sperber |
| 5,318,990 A | 6/1994 | Strauss |
| 5,340,868 A | 8/1994 | Strauss et al. |
| 5,623,032 A | 4/1997 | Wu |
| 5,661,213 A | 8/1997 | Arkens et al. |

FOREIGN PATENT DOCUMENTS

| | | |
|---|---|---|
| EP | 0 583 086 | 2/1994 |
| EP | 0 882 094 | 12/1998 |
| WO | WO 01 08870 | 2/2001 |

*Primary Examiner*—Kriellion A. Sanders
(74) *Attorney, Agent, or Firm*—Inger H. Eckert; Stephen W. Barns

(57) ABSTRACT

A type of (and method of making) fiberglass insulation is disclosed. Such insulation comprises: glass fibers; a polyacrylic glycerol (PAG) binder coating said glass fibers; and at least one of a coloring agent and a biocide adhered to said PAG binder. Such fiberglass insulation can take the form of a batt, board (a heated and compressed batt) or molding media (a different form of heated and compressed batt). The coloring agent and/or the biocide can be applied where the batt (or board or molding media, as the case may be) is manufactured or can be applied after the batt is installed in the field.

23 Claims, 2 Drawing Sheets

COLORABLE FIBERGLASS INSULATION

FIELD OF THE INVENTION

The invention is generally directed to fiberglass insulation, and more particularly to colorable fiberglass insulation, and more particularly to colorable, PAG-bindered fiberglass insulation.

BACKGROUND OF THE INVENTION

Fiberglass insulation in the form of a batt, a board or molding media, includes glass fibers and a binder. Typically, the binder is phenolic. Though relatively inexpensive and though it cures to form a rigid thermoset polymeric matrix, phenolic binder has some problems. It is not low in odor. And, it causes the batt, board or molding media to appear to be yellow.

Phenolic binder binds the glass fibers by agglomeration, i.e., by sticking to glass fibers only where any two glass fibers come into contact with each other. This is very different than coating each fiber in its entirety such that the coating on one fiber adheres to the coating on another fiber. Coloring agents do not adhere well to phenolic binder. And to the extent that a coloring agent adheres, it is present on only a small portion of the glass fiber, thus diluting the effect of the coloring agent.

In some circumstances, the fiberglass insulation is exposed, i.e., not concealed behind wallboard inside a stud wall cavity or installed behind a translucent fabric covering (with an open weave). Such a circumstance can be a system in which the board or molding media forms of the fiberglass insulation is attached to a wall to help tune the sound of a room. In such an exposed insulation situation, the default yellow color of phenolic-bindered insulation can clash with the decoration in the room and/or appear to distort the color of the overlying fabric. And phenolic-bindered insulation hides dirt poorly.

In the exposed circumstance, typical phenolic-bindered fiberglass insulation can be made to appear to have a non-yellow color in one of three ways. First, a colorable facing (of paper and/or foil) can be applied to the insulation. Second, the surface can be coated with a paint sufficiently thick that it acoustically "blinds" the insulation. In other words, the paint is viscous enough and is applied heavily enough that, in effect, a facing of paint is formed that closes all the interstices of the insulation. But this damages the acoustic properties of the insulation because it changes the permeability of the insulation to air. Lastly, third, an inorganic pigment can be applied to the agglomerations, which produces a diffused color in combination with the clear glass fibers that are only covered at the points of agglomeration.

Easily colorable insulation is available in the form of cellulose. Cellulose is a wood fiber insulation. The wood fibers can be colored. But cellulose has the disadvantages that it is flammable and it tends to mold.

A colorable form of fiberglass insulation is known. It uses polyacrylic glycol (PAG) as a binder. Such insulation appears white in color. It is low in odor, which makes it desirable for high temperature applications, such as in an oven. A disadvantage of PAG-binder is that it is about twice as expensive as phenolic binder.

SUMMARY OF THE INVENTION

The invention, in part, is a recognition that PAG-binder coats each glass fiber substantially in its entirety, such that the coating on one fiber adheres to the coating on another fiber, unlike the agglomeration of the background art.

The invention, also in part, is a recognition that coloring agents adhere readily to PAG-binder.

The invention, also in part, is a recognition that because the PAG binder coats each glass fiber substantially in its entirety, the coloring agent adhered to the PAG binder coats each glass fiber substantially in its entirety. To borrow a concept from the painting art, in effect, the PAG binder acts as a primer to prepare the whole glass fiber to be coated with the desired coloring agent. This produces a strong color in PAG-bindered fiberglass insulation.

The invention, also in part, is a recognition that biocide adheres readily to PAG-binder, with or without a coloring agent being present on the PAG binder.

The invention, in part, provides fiberglass insulation comprising: glass fibers; a polyacrylic glycerol (PAG) binder coating said glass fibers; and at least one of a coloring agent and a biocide adhered to said PAG binder. Such fiberglass insulation can take the form of a batt, board (a heated and compressed batt) or molding media (a different form of heated and compressed batt). The invention, also in part, provides a method of making such an insulation product.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

Figure 1:
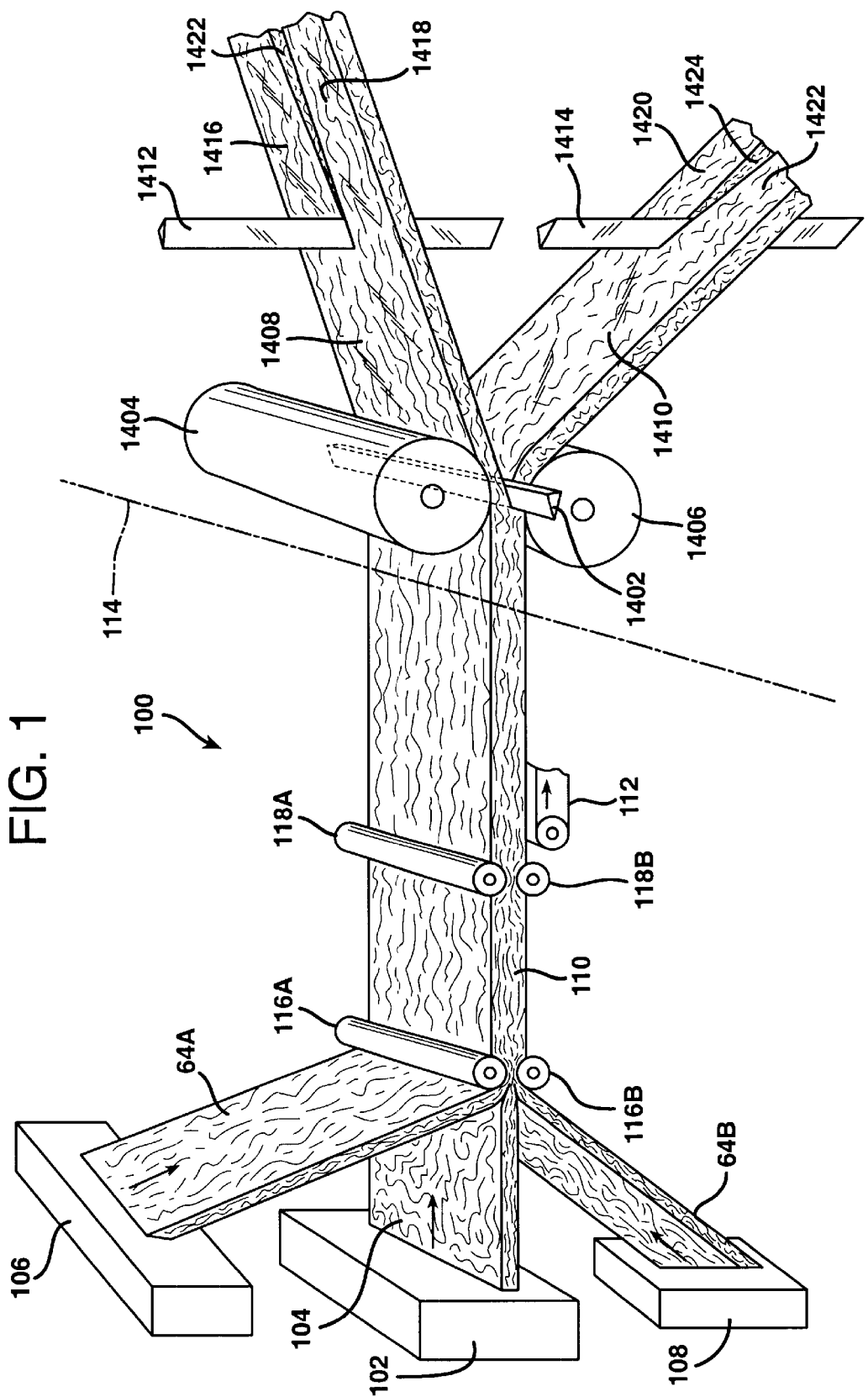
FIG. 1 is a three-quarter perspective view of an embodiment for forming dual layer batts according to the invention.
Figure 3:
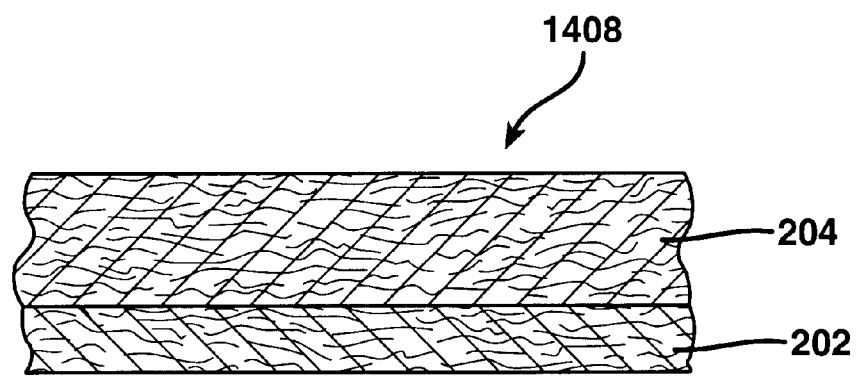

And, FIG. 3 is a cross-sectional view of a dual layer batt produced in FIG. 1.

The figures are not drawn to scale.

DETAILED DESCRIPTION OF PREFERRED EMBODIMENTS

The invention, in part, provides fiberglass insulation comprising: glass fibers; a polyacrylic glycerol (PAG) binder coating said glass fibers; and at least one of a coloring agent and a biocide adhered to said PAG binder. Such binders are known for use in connection with fiberglass insulation. Examples of such binder technology are the following U.S. Pat. Nos., the entirety of each of which is hereby incorporated by reference: 5,661,213 to Arkens et al.; 5,340,868 to Strauss et al.; and 5,318,990 to Strauss.

Fiberglass insulation according to the invention can take the form of a batt, board (a heated and compressed batt) or molding media (a different form of heated and compressed batt). Typically, fiberglass batt insulation is of a density less than 1 lb/ft$^3$, and about 4–5% of its weight is binder. Typically, fiberglass board is of a density 1–10 lbs/ft$^3$, and about 7–12% of its weight is binder. Typically, fiberglass molding media is of a density of 10–20 lbs/ft$^3$, and about 12–18% or greater of its weight is binder.

Generally, the formation of fibrous glass insulation batts is known, e.g., see U.S. Pat. No. 5,340,868 to Strauss et al., the entirety of which has been incorporated by reference. Also, the formation of board fiberglass insulation is known. And the formation of molding media insulation is known, see U.S. patent application Ser. No. 09/001,633, filed by Scott Sevenish et al. on Dec. 31, 1997 and subject to an obligation to assign to the same assignee as the present invention, the entirety of which is hereby incorporated by reference.

It is generally well-known in the art to produce a porous batt of fibrous glass by fiberizing molten glass and immediately forming a fibrous glass batt on a moving conveyor. Glass is melted in a tank and supplied to a fiber-forming device such as a spinner or a bushing. Fibers of glass are attenuated from the device and are blown generally downwardly within a forming chamber. The glass fibers typically have a diameter from about 2 to about 9 microns and have a length from about ¼ inch to about 3 inches. Preferably, the glass fibers range in diameter from about 3 to about 6 microns, and have a length from about ½ inch to about 1 ½ inches. The glass fibers are deposited onto a perforated, endless forming conveyor. The binder is applied to the glass fibers as they are being formed by suitable spray applicators so as to result in a distribution of the binder throughout the formed batt of fibrous glass. The glass fibers, having the uncured resinous binder adhered thereto (agglomerated in the case of the Background Art phenolic binder), are gathered and formed into a batt on the endless conveyor within the forming chamber with the aid of a vacuum drawn through the batt from below the forming conveyor. The residual heat contained in the glass fibers as well as the air flow through the batt causes a majority of the water to volatilize from the batt before it exits the forming chamber.

As the high-solids resin-coated fibrous glass batt emerges from the forming chamber, it expands vertically due to the resiliency of the glass fibers. The expanded batt is then conveyed to and through a curing oven. In the curing oven, heated air is passed through the insulation product to cure the resin. Also in the curing oven, the insulation product is compressed to form it into a blanket, batt or board. Or, in the case of molding media, an incompetely cured batt is moved to an off-line molding press (where curing is completed). Flights/rollers above and below the batt slightly compress the batt. to give the finished product a predetermined thickness and surface finish. Typically, the curing oven is operated at a temperature from about 200° C. to about 325 degree. C. Preferably, the temperature ranges from about 250° C. to about 300° C. Generally, the batt resides within the oven for a period of time from about ½ minute to about 3 minutes. For the manufacture of known thermal or acoustical insulation products, the time ranges from about ¾ minute to about 1 ½ minutes. The fibrous glass having a cured, rigid binder matrix emerges from the oven in the form of a bat which may be compressed for packaging and shipping and which will thereafter substantially fully recover its as-made vertical dimension when unconstrained. By way of example, a fibrous glass batt which is about 1 ¼ inches thick as it exits from the forming chamber, will expand to a vertical thickness of about 9 inches in the transfer zone, and will be slightly compressed to a vertical thickness of about 6 inches in the curing oven.

An important aspect of the invention is to substitute PAG binder for the phenolic binder of the Background Art. This is done by piping PAG binder into the known fiber-forming devices instead of the phenolic binder.

Thus, the method of formation of a batt according to the invention comprises: applying the water-carried PAG binder to glass fibers as they are being produced and formed into a batt; heating the batt so that water is volatilized from the binder; and further heating the high-solids binder-coated fibrous glass batt to cure the binder and thereby produce a finished fibrous glass batt. Such a batt can be used as a thermal or acoustical insulation product, a reinforcement for a subsequently produced composite, etc.

Another, optional (assuming the presence of the biocide discussed below) aspect of the invention is to include a coloring agent component in the batt. The coloring agent can be mixed with the PAG binder, or pumped separately into the known fiber-forming device for application to the batt moving along the conveyor after the PAG binder is applied. Examples of PAG-binder-compatible coloring agents are: carbon black pigment; NIGROSINE brand of black dye; and VAT RED brand of red dye.

For external application of the glass fiber batt (or board or molding media) where the batt is visible, darker colors are preferred because they hide dirt better than the yellow, phenolic-bindered batt of the Background Art or the white batt that results from not adding a coloring agent to a PAG-bindered batt.

A further alternative for adding a coloring agent to the batt is to apply the coloring agent in the field. In other words, the coloring agent is not added to the batt at the place of manufacture. Rather, once the batt is shipped to the installation location and installed, then the coloring agent can be applied by spraying the batt (or board or molding media as the case may be). This is referred to as a post-installation technique.

An advantage of the post-installation technique is that only the uncolored, PAG-bindered batt (or board or molding media) has to be manufactured. Coloration can be delayed until the installation, and done in only the amount necessary for the particular installation. The post-installation technique typically produces only a skin layer that is colored because the sprayed-on coloring agent need not, and may not be able to, completely penetrate the installed batt. This has the additional advantage of minimizing the quantity of coloring agent needed to give the impression of a colored batt (or board or molding media). Care should be taken to not blind the batt, i.e., to not have the coloring agent be so viscous and so thickly applied that it fills the interstices of the batt. This would damage the acoustic properties of the batt.

Another, optional (assuming the presence of the coloring agent) aspect of the invention is to include a biocide component in the batt. The biocide can be pumped into the known fiber-forming device for application to the batt moving along the conveyor, after the PAG binder is applied. Examples of PAG-binder-compatible biocides are silver zeolyte, KATHON brand of biocide marketed by the ROHM & HAAS company, AMICAL 48 brand of biocide marketed by the ANGUS CHEMICAL company, and HEALTHSHIELD brand of biocide marketed by HEALTHSHIELD TECHNOLOGIES, LLC.

A further (less preferred) alternative for adding the biocide to the batt is to apply the biocide in the field. In other words, the biocide is not added to the batt at the place of manufacture. Rather, once the batt is shipped to the installation location and installed, then the biocide can be applied by spraying the batt (or board or molding media as the case may be). This is referred to as a post-installation technique.

A disadvantage of the post-installation technique is that it only creates a skin layer that is protected with biocide because the sprayed-on biocide cannot completely penetrate the installed batt. Care should be taken to not blind the batt, i.e., to not have the biocide be so viscous and so thickly applied that it fills the interstices of the batt. This would damage the acoustic properties of the batt. But an advantage of the postinstallation technique is that only the non-biocide-treated, PAG-bindered batt (or board or molding media) has to be manufactured. Biocide treatment can be delayed until the installation, and done in only the amount necessary for the particular installation.

FIG. 1 is a three-quarter perspective view of an embodiment of a system 100 for forming dual layer batts according to the invention. FIG. 1 depicts three known fiber-forming devices 102, 106 and 108 that produce three fiberglass insulation batts 104, 64A and 64B, respectively. The batt 104 can contain PAG binder, while the batts 64A and 64B can contain the known phenolic binder. The fiber forming device 102 forms the PAG-bindered batt 104 by substituting the known phenolic binder for PAG binder, as described above.

The batts 104, 64A and 64B are brought together at pinch rollers 116A and 116B where they are compressed. By controlling the parameters of the system 100, the batts 104, 64A and 64B will be sufficiently incompletely cured that they can bond together upon compression by the pinch rollers 116A and 116B. The pinch rollers 116A and 116B optionally can be heated.

A second set of optional pinch rollers 118A and 118B are depicted downstream from pinch rollers 116A and 116B. The pinch rollers 118A and 118B optionally can be heated. Additional heating devices (not depicted) can be located downstream from the pinch rollers 116A and 116B, if needed to finish curing the binder in the batt 110. A known conveyor arrangement 112 is partially depicted as a simplification to the drawing.

The portion of FIG. 1 to the right of the dashed line 114 depicts an arrangement for horizontally splitting the three layer batt 10 into a first dual layer batt 1408 and a second dual layer batt 1410. A blade (or saw) 1402 is positioned to horizontally split the three layer batt 110 into the two dual layer batts 1408 and 1410. The first dual layer batt 1408 is guided upward by a first roller 1404. The second dual layer batt 1410 is guided downward by a second roller 1406.

In FIG. 1, for batts, a known curing oven (not depicted, for simplicity) could be located between the pinch rollers 116A and 116B and the rollers 1404 and 1406. But for molding media, the batt 110 would be left uncured and taken off-line to the molding press. Then, after molding, the molding media could be split, if desired, according to, e.g., the arrangement to the right of the dashed 114 in FIG. 1.

If desired, each of the dual layer batts 1408 and 1410 can be vertically slit to increase the number of dual layer products or lanes. The dual layer batt 1408 is slit into the lanes 1416 and 1418 (separated by a gap 1422) via a vertically-oriented blade (or saw) 1412. The dual layer batt 1410 is slit into the lanes 1420 and 1422 (separated by a gap 1424) via a vertically-oriented blade (or saw) 1414.

Figure 2:
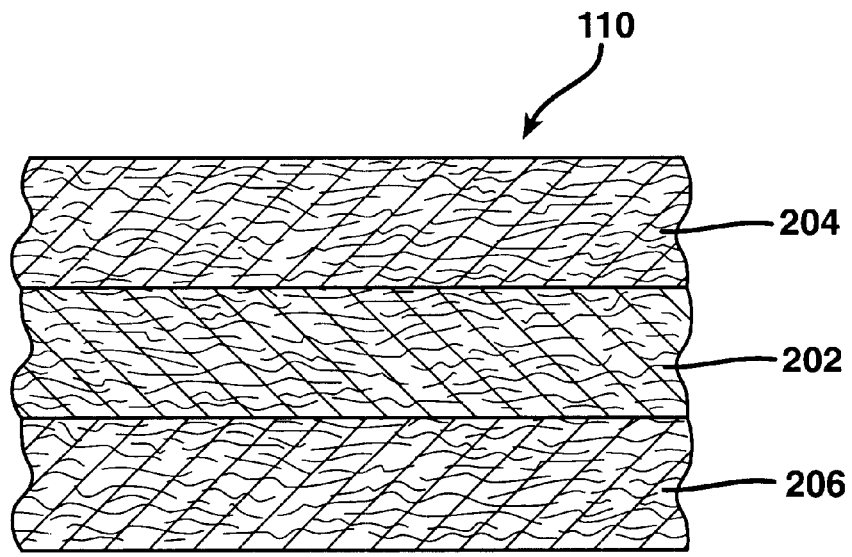
FIG. 2 is a cross-sectional view of a three layer batt produced as an intermediary product in FIG. 1.

FIG. 2 is a cross-sectional view of a three layer batt 110 produced as an intermediary product in FIG. 1. In FIG. 2, the batt 110 has a first, PAG-bindered layer 202 corresponding to batt 104, a second, phenolic-bindered layer 204 corresponding to batt 64A and a third, phenolic-bindered layer 206 corresponding to batt 64B.

FIG. 3 is a cross-sectional view of a dual layer batt 1408 produced in FIG. 1. FIG. 3 can be described as one-half of FIG. 2 after it has been split through layer 202. As such, layer 202 in FIG. 3 is about half the thickness of the layer 202 in FIG. 2. The dual layer batt of FIG. 3 is a lower cost product for post-installation coloration because only a thickness of the batt needed for coloration is made to have the PAG-binder, which is more expensive than the phenolic binder.

An alternative implementation of FIG. 1 is to have all three batts 104, 64A and 64B be PAG-bindered and then to apply different coloring agents to the layers 202, 204 and 206, respectively. Further in the alternative, the batts 64A and 64B could all be of different densities than batt 104, though batts 64A and 64B could all be of the same density.

The invention being thus described, it will be obvious that the same may be varied in many ways. Such variations are not to be regarded as a departure from the spirit and scope of the invention, and all such modifications as would be obvious to one skilled in the art are intended to be included within the scope of the following

What is claimed is:

1. Fiberglass insulation comprising:

glass fibers;

a polyacrylic glycerol (PAG) binder coating said glass fibers; at least one of a coloring agent and a biocide adhered to said PAG binder;

wherein said glass fibers represent a first volume of glass fibers and said coloring agent is a first coloring agent and said first volume of glass fibers, said PAG binder and said first coloring agent define a first layer; and a second layer attached to said first layer, said second layer including a second volume of glass fibers and another binder applied to said glass fibers.

2. The fiberglass insulation of claim 1, wherein said insulation takes the form of a batt, board or molding media.

3. The fiberglass insulation of claim 1, wherein said insulation comprises said biocide, and said biocide is silver zeolyte.

4. The fiberglass insulation of claim 1, wherein said another binder is a phenolic binder.

5. The fiberglass insulation of claim 1, wherein said another binder is also PAG binder that coats said glass fibers of said second volume thereof; and wherein said second layer further includes a second coloring agent different than said first coloring agent.

6. The fiberglass insulation of claim 1, wherein said second volume of glass fibers is of a different density than said first volume.

7. The fiberglass insulation of claim 1, wherein at least one of said first and second volumes of glass fibers is molding media.

8. The fiberglass insulation of claim 1, wherein both of said first and second volumes of glass fibers are molding media.

9. The fiberglass insulation of claim 1, wherein said insulation comprises said coloring agent, and said coloring agent on said PAG binder is non-white and non-yellow.

10. The fiberglass insulation of claim 9, wherein said coloring agent on said PAG binder is being black.

11. A method of making fiberglass insulation comprising:

forming glass fibers into a pair of layers;

applying a polyacrylic glycerol (PAG) binder coating to said glass fibers; and applying at least one of a coloring agent and a biocide that can adhere to said PAG binder.

12. The method of claim 11, wherein the coloring agent, PAG-bindered glass fibers are formed into a batt.

13. The method of claim 12, wherein said PAG binder in said batt is uncured, the method further comprising:

heating and compressing said batt to form molding media.

14. The method of claim 11, wherein said biocide is applied, and wherein said biocide is silver zeolyte.

15. The method of claim 11:
- wherein said forming of said layers and said applying of PAG binder produce a white insulation product; and
- wherein said applying of coloring agent is carried out at least proximate to a site of installation of said insulation product rather than at a site of manufacture of thereof.

16. The method of claim 11, wherein said pair of layers includes a first layer and a second layer, the method further comprising:
- forming glass layers into a third layer;
- applying another binder to said second and third layers;
- bringing said second and third layers into contact with said first layer so as to make a sandwich having said first layer as a filling thereof;
- bisecting said first layer so as to produce a first and a second dual layer batts, said first dual layer batt being formed of said second layer and part of said first layer, and said second dual layer batt being formed of said third layer and part of said first layer.

17. The method of claim 16, wherein said PAG binder in said layers is incompletely cured, the method further comprising:
- heating and compressing at least one of said first and second dual-layer batts to form fiberglass board or fiberglass molding media.

18. The method of claim 16, wherein said another binder is a phenolic binder.

19. The method of claim 16,
- wherein said another binder is also PAG binder that coats said glass fibers of said second and third layers thereof; and
- wherein said second and third layers further include a second and third coloring agent, respectively, different than said first coloring agent.

20. The method of claim 16, wherein said second and third layers of glass fibers are of a different density, respectively, than said first layer.

21. The method of claim 11, wherein said coloring agent is applied, and wherein said coloring agent on said PAG binder is non-white and non-yellow.

22. The method of claim 21, wherein said coloring agent on said PAG binder is black.

23. A method of making fiberglass insulation comprising:
- forming glass fibers into a layer;
- applying a polyacrylic glycerol (PAG) binder coating to said glass fibers; and
- applying at least one of a coloring agent and a biocide that can adhere to said PAG binder, wherein said forming of said layer and said applying of PAG binder produce a white insulation product and said applying of coloring agent is carried out at least proximate to a site of installation of said insulation product rather than at a site of manufacture thereof.

* * * * *